US010222604B2

(12) United States Patent
Kuhn et al.

(10) Patent No.: US 10,222,604 B2
(45) Date of Patent: Mar. 5, 2019

(54) IMAGE-BASED LASER AUTOFOCUS SYSTEM

(71) Applicant: CELLOMICS, INC., Pittsburgh, PA (US)

(72) Inventors: Ronald Albert Kuhn, North Huntingdon, PA (US); Kim Anthony Ippolito, South Park, PA (US); Dirk John Vandenberg, III, Pittsburgh, PA (US)

(73) Assignee: CELLOMICS, INC., Pittsburgh, PA (US)

( * ) Notice: Subject to any disclaimer, the term of this patent is extended or adjusted under 35 U.S.C. 154(b) by 155 days.

(21) Appl. No.: 14/812,874

(22) Filed: Jul. 29, 2015

(65) Prior Publication Data
US 2016/0041380 A1    Feb. 11, 2016

Related U.S. Application Data

(60) Provisional application No. 62/034,045, filed on Aug. 6, 2014.

(51) Int. Cl.
| | |
|---|---|
| *G02B 7/36* | (2006.01) |
| *G02B 7/28* | (2006.01) |
| *G02B 21/00* | (2006.01) |
| *G02B 21/16* | (2006.01) |
| *G02B 21/24* | (2006.01) |
| *G02B 21/36* | (2006.01) |
| *H04N 5/232* | (2006.01) |

(52) U.S. Cl.
CPC ............ *G02B 21/365* (2013.01); *G02B 7/28* (2013.01); *G02B 7/36* (2013.01); *G02B 21/0088* (2013.01); *G02B 21/16* (2013.01); *G02B 21/244* (2013.01); *G02B 21/245* (2013.01); *G02B 21/361* (2013.01); *G02B 21/367* (2013.01); *H04N 5/23212* (2013.01)

(58) Field of Classification Search
CPC ......... G02B 7/28; G02B 7/36; H04N 5/23212
USPC ........................................................ 348/79
See application file for complete search history.

(56) References Cited

U.S. PATENT DOCUMENTS

| | | | | |
|---|---|---|---|---|
| 5,404,163 | A | * | 4/1995 | Kuho ................. G02B 7/36 348/142 |
| 5,548,661 | A | * | 8/1996 | Price ................. G01N 15/147 348/80 |
| 5,594,235 | A | * | 1/1997 | Lee .................. G01N 21/94 250/201.3 |
| 5,672,861 | A | * | 9/1997 | Fairley .............. G02B 21/244 250/201.3 |

(Continued)

OTHER PUBLICATIONS

International Search Report and Written Opinion for PCT/US2015/042725 dated Sep. 10, 2015.

*Primary Examiner* — Deirdre L Beasley
(74) *Attorney, Agent, or Firm* — Workman Nydegger

(57) ABSTRACT

Accurate, reliable, and robust laser-based autofocus solutions are presented for through-the-lens microscope applications using slides or micro-titer plates. The laser-based autofocus solutions solve many of the problems that have arisen due to multiple reflective surfaces at varying distances relative to a sample of interest. The laser-based autofocus solutions provide a unique solution to resolve the ambiguity caused by these multiple reflective surfaces by using an image-based approach.

20 Claims, 15 Drawing Sheets

(56) References Cited

U.S. PATENT DOCUMENTS

| | | | | |
|---|---|---|---|---|
| 5,932,872 A * | 8/1999 | Price | ............ | G01N 15/147 250/201.3 |
| 8,643,946 B2 * | 2/2014 | Westphal | ............ | G02B 7/36 359/368 |
| 9,568,724 B2 * | 2/2017 | Westphal | ............ | G02B 21/244 |
| 2002/0186874 A1 * | 12/2002 | Price | ............ | G01N 15/147 382/133 |
| 2003/0222197 A1 * | 12/2003 | Reese | ............ | G02B 21/367 250/206 |
| 2005/0006595 A1 * | 1/2005 | Goodwin | ............ | G01N 15/1475 250/458.1 |
| 2005/0121596 A1 * | 6/2005 | Kam | ............ | G01N 21/6458 250/201.2 |
| 2005/0270611 A1 * | 12/2005 | Oshiro | ............ | G02B 21/244 713/186 |
| 2006/0001954 A1 * | 1/2006 | Wahl | ............ | G02B 21/086 359/368 |
| 2007/0031056 A1 * | 2/2007 | Perz | ............ | G02B 21/244 382/255 |
| 2007/0038384 A1 * | 2/2007 | Kirk | ............ | G01N 33/5091 702/19 |
| 2008/0100703 A1 * | 5/2008 | Yamada | ............ | G02B 21/36 348/79 |
| 2008/0225278 A1 * | 9/2008 | Namba | ............ | G01N 21/6458 356/123 |
| 2009/0196482 A1 * | 8/2009 | Kobayashi | ............ | G01N 21/6458 382/133 |
| 2010/0025567 A1 * | 2/2010 | Lueerssen | ............ | G02B 21/245 250/205 |
| 2010/0054597 A1 * | 3/2010 | Dhawan | ............ | G06K 9/342 382/173 |
| 2010/0177189 A1 * | 7/2010 | Rughani | ............ | G02B 21/367 348/79 |
| 2011/0064296 A1 * | 3/2011 | Dixon | ............ | G01N 21/6428 382/133 |
| 2011/0101203 A1 * | 5/2011 | Cooper | ............ | G02B 21/245 250/201.4 |
| 2012/0097835 A1 * | 4/2012 | Sharonov | ............ | G02B 21/0032 250/201.3 |
| 2012/0188359 A1 * | 7/2012 | Karube | ............ | G02B 21/244 348/79 |
| 2012/0220022 A1 * | 8/2012 | Ehrlich | ............ | G01N 15/14 435/286.2 |
| 2012/0312957 A1 * | 12/2012 | Loney | ............ | G02B 21/245 250/201.3 |
| 2013/0064468 A1 * | 3/2013 | Kask | ............ | G06T 5/30 382/257 |
| 2013/0100272 A1 * | 4/2013 | Price | ............ | G02B 7/38 348/79 |
| 2013/0271995 A1 * | 10/2013 | Udo | ............ | G02B 21/245 362/259 |
| 2014/0168402 A1 * | 6/2014 | Fuller | ............ | G02B 21/361 348/79 |
| 2014/0168660 A1 * | 6/2014 | Yan | ............ | G01B 9/02064 356/511 |
| 2014/0210981 A1 * | 7/2014 | Stauffer | ............ | G01B 11/06 348/79 |
| 2014/0253924 A1 * | 9/2014 | Sano | ............ | G01J 3/2823 356/456 |

* cited by examiner

IMAGE-BASED LASER AUTOFOCUS SYSTEM

CROSS REFERENCE TO RELATED APPLICATIONS

This application claims priority to U.S. Provisional Patent Application No. 62/034,045, filed on Aug. 6, 2014, the contents of which are hereby incorporated by reference.

BACKGROUND OF THE INVENTION

1. Field

The present application relates to systems and methods for autofocusing an imaging device. More particularly, the present application relates to autofocusing using an image-based laser autofocus system for through-the-lens microscope applications using slides or microtiter plates

2. The Relevant Technology

To image a sample on a plate or slide, an imaging device is used. The imaging device and/or sample are moved closer to or farther away from each other until the sample is in focus through the imaging device. For automated systems, such as high content imaging (HCI) systems, an autofocus is often used to speed up the process.

Various types of auto-focus systems are currently used, including image-based systems and laser-based systems. While these conventional systems provide certain advantages over non auto-focus systems, they have certain drawbacks and do not always provide the level of focus required by automated systems at the speed desired.

BRIEF SUMMARY OF THE INVENTION

Accurate, reliable, and robust laser-based autofocus solutions are presented for through-the-lens microscope applications using slides or micro-titer plates. The laser-based autofocus solutions solve many of the problems that have arisen due to multiple reflective surfaces at varying distances relative to a sample of interest. The laser-based autofocus solutions provide a unique solution to resolve the ambiguity caused by these multiple reflective surfaces by using an image-based approach.

The foregoing summary is illustrative only and is not intended to be in any way limiting; the summary is provided to introduce a selection of concepts in a simplified form that are further described below in the Detailed Description. The summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of embodiments described or envisioned herein. The features and advantages of embodiments described or envisioned herein may be realized and obtained by means of the instruments and combinations particularly pointed out in the appended claims. These and other features will become more fully apparent from the following description and appended claims, or may be learned by the practice of embodiments described or envisioned herein as set forth hereinafter.

BRIEF DESCRIPTION OF THE DRAWINGS

Various embodiments will now be discussed with reference to the appended drawings. It should be appreciated that these drawings depict only typical embodiments and are therefore not to be considered limiting of the scope of the application. It should also be appreciated that the drawings are not necessarily drawn to scale and that some of the elements may be drawn merely for clarity sake.

In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") when referring to a specific instance of the element.

DETAILED DESCRIPTION

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Furthermore, as used in the specification and appended claims, directional terms such as "top," "bottom," "left," "right," "up," "down," "upper," "lower," "proximal," "distal" and the like are used herein solely to indicate relative directions and are not otherwise intended to limit the scope of the specification or claims.

Figure 1:
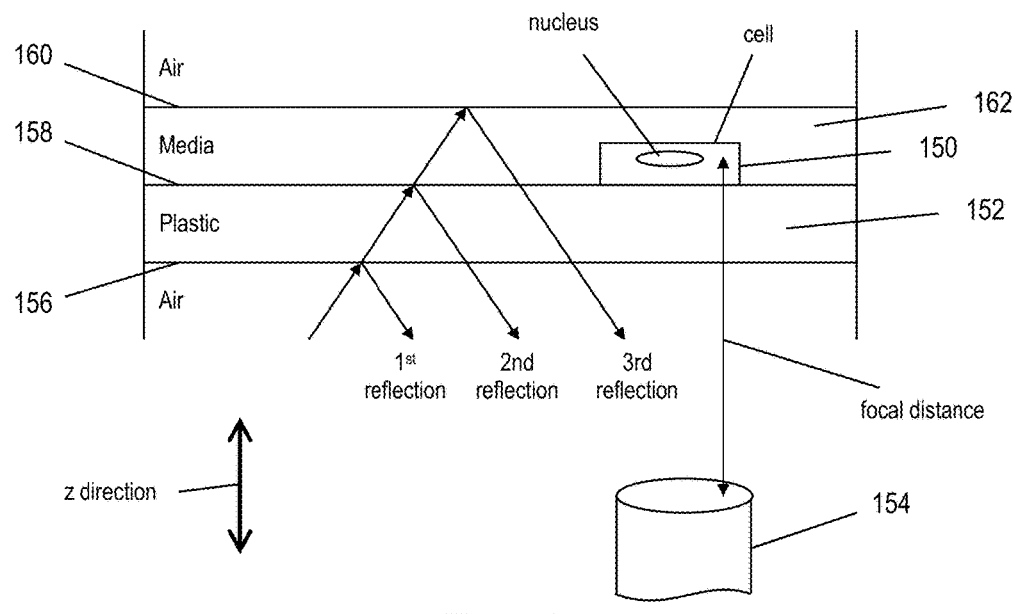
FIG. 1 is a block diagram showing various surfaces of an imaging plate and the reflections that can occur therefrom.

As illustrated in FIG. 1, to image a sample 150 on a plate or slide 152, an imaging component 154, e.g., a microscope objective, is used. For ease of discussion, we will base our discussion on the sample being positioned on a plate. However, it should be appreciated that the discussion herein can also be applied to a slide or other device on which a sample can be positioned to be imaged.

Imaging component 154 and/or plate 152 are moved closer to or farther away from each other vertically to focus sample 150 through imaging component 154. Referring to FIG. 1, we shall define herein the vertical direction of movement as the z direction. As such, the position of any component in the z direction may be referred to as the "z-position" of that item and the distance between components in the z direction may be referred to as the "z-distance" between the components. The z-distance between imaging component 154 and sample 150 when the sample is in focus shall be defined herein as the "focal distance". We shall also refer to the z-positions of imaging component 154 and sample 150 as a "focal position" of each of the items.

As shown in FIG. 1, the z-distance between imaging component 154 and sample 150 is a combination of (1) the z-distance between imaging component 154 and plate 152, (2) the z-distance through plate 152, and (3) the z-distance from plate 152 to the portion of sample 150 for which an image is desired. Typically, the desired portion of sample 150 to be imaged is at the surface of plate 152, essentially negating the z-distance between the plate and the portion of the sample.

If sample 150 is not in focus during imaging, many problems can arise. To be in focus, imaging component 154 must be at a particular focal distance away from sample 150.

Imaging component 154 and/or sample 150 is/are moved in the z direction to change the z-distance between them until the sample comes into focus. At that point, the z-distance equals the focal distance and the sample and imaging component are at focal positions corresponding to the focal distance. Although the discussion herein shall be geared toward moving imaging component 154 to obtain the desired focal distance, it should be appreciated that plate 152 can also be moved, either alternatively to or in conjunction with imaging component 154. It should also be appreciated that imaging component 154 can be positioned above or below sample 150.

Because plate 152 is positioned between sample 150 and imaging component 154, the z-position of each sample will vary with variations in the shape or position of the plate. As a result, the z-position of a sample in one field may be different than the z-position of a sample in another field. As such, the z-distance between each sample and the imaging component may vary if the imaging component is not moved.

Figure 2:
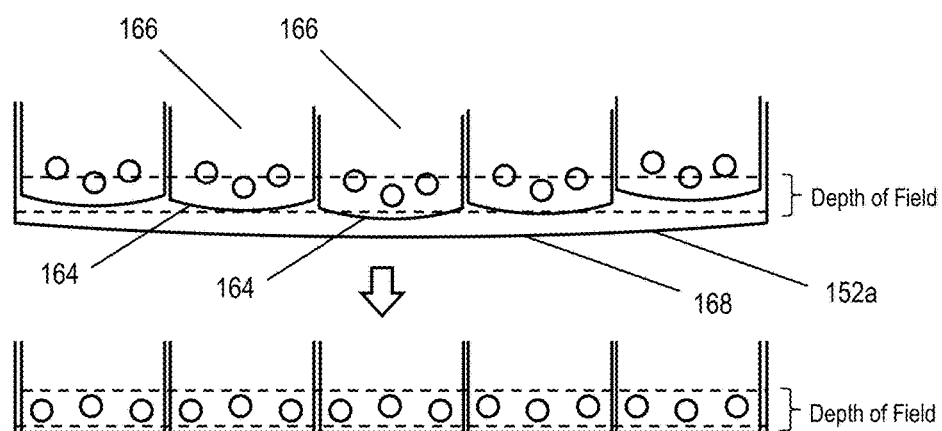
FIG. 2 illustrates an example in which the z-position of samples may be different from one another in a well or a plate.

FIG. 2 shows one example in which the z-position of samples may be different from one another in a well or a plate. As depicted, a curvature 164 may exist on each of one or more wells 166. This curvature can cause the z-distance to vary between the objective and each sample in the corresponding well. In addition, a curvature 168 may exist on the entire plate 152a. This curvature can cause the z-distance to vary between the objective and samples in different wells. A combination of the two types of curvatures 164 and 168, such as in the depicted embodiment, can exacerbate the problem. Furthermore, a plate can have random variations in its thickness, making the problem virtually impossible to model. In fact, the shape of plates can vary unpredictably even across plates created in the same manufacturing run.

Due to these z-distance variations, the z-position of imaging component 154 must change accordingly to maintain the correct focal distance to each sample and effectively "remove" the undesired plate and/or well curvatures as represented by the bottom portion of FIG. 2. Doing so will allow each sample to be imaged at the desired focal distance.

To attempt to remedy this situation, image-based autofocus has been employed to determine the z-location of samples in each field, which can then be used to move the imaging component and/or plate to arrive at the correct focal distance. In this approach, the sample is imaged for autofocus purposes using the same detection mode as is used to image the sample for screening purposes (e.g., fluorescence, brightfield, etc.). Although this approach has provided many benefits, it has a number of drawbacks, including:

Speed—images must be taken at different z-distances while searching for the correct focal distance. This becomes a problem when the necessary exposure time to image the sample is long.

Photo bleaching—photo bleaching caused by focus imaging may affect the sample, and thus alter the resulting image of the sample used for screening.

Thick samples—when the sample is thicker than the depth of field of the optics system, the best visually focused image may not be at the same relative position into the sample from field to field. This can cause measurements to be made in drastically different regions, which can lead to misinterpretation of the results.

Difficult to image, or sparse, biology—sometimes samples are difficult to image or very sparse on the plate. This can cause software-based autofocus algorithms to select a focus position that is not correct.

Laser-based autofocus (LAF) systems overcome many of these issues. LAF systems employ a laser to determine the focal distance. As such, LAF systems use an imaging mode that is different than the imaging mode used to screen samples by the device. The laser determines the location of the plate by detecting a surface thereof. This is then used as a reference to estimate where to find the sample. For example, the sample can be estimated to reside a fixed number of micrometers from the location of the plate. To determine the location of the plate, an LAF system can use the reflectivity of the interface between the plate and the surrounding media.

For microscopy applications where the sample resides between the slide and a coverslip, or on a microtiter plate where the imaging system must focus through a clear plastic or glass bottom of the plate, the laser auto-focus system is presented with a particular problem—there are typically several reflective surfaces, each at different z-positions. For example, in the embodiment shown in FIG. 1 at least three reflective surfaces are present—the upper and lower surfaces 156, 158 of plate 152 and the upper surface 160 of the media 162 in which sample 150 is positioned. Each of these surfaces can produce separate reflections of the laser light, which can cause confusion for autofocus systems.

A first and typically brightest reflection comes from the nearest surface of the plate (e.g., lower surface 156 of plate 152). This surface shall be referred to herein as the "outer" surface. The reflection from the outer surface is caused by the interface between air and the material of the plate, typically plastic or glass.

However, the outer surface is not where the sample of interest is usually located in the z direction. Instead, the sample is typically located at or beyond a further surface of the plate. For example, as depicted in FIG. 1 sample 150 is located at or slightly beyond the upper surface 158 of plate 152. This further surface shall be referred to herein as the "inner" surface.

A second reflection comes from this inner surface, and is caused by the interface between the material of the plate and either air or liquid media surrounding the sample. The second reflection is generally much weaker than the first reflection, making the second reflection difficult to detect or distinguish from the first reflection. Other reflections may come from other surfaces, making detection and differentiation that much more difficult. For example, as depicted in FIG. 1, a third reflection can come from the upper surface 160 of media 162, caused by the interface between the media and air.

As noted above, the z-distance between the outer surface and the inner surface can vary across a plate and/or across wells within the plate. As a result, the z-position of the outer surface is generally not a good reference for determining the z-location of a sample. Instead, because the sample is general positioned directly on the inner surface of the plate, the z-position of the inner surface is a better reference to use. If the z-position of the inner surface can be determined, it can be used to more accurately position the imaging component to obtain a focused image.

Two main approaches have been employed by LAF systems for attempting to determine the z-location of the inner and outer surfaces of microtiter plates and slides with coverslips. In the first approach, reflections from the inner and outer surfaces are simultaneously detected and the locations of the surfaces are indicative of the z-positions from focus. To accomplish this, a laser is positioned at an angle to the incidence angle of the surfaces so that when the laser is shined onto the plate, the reflections are each returned at an angle, similar to that shown in FIG. 1. A linear array of sensors is positioned to detect the reflections. Because of the angle of the laser light, the reflections return at different positions from each other on the sensor array. As a result, the position of the reflections detected by the linear array can be used to determine the z-positions of the surfaces. This allows an estimate for the z-position of the sample to be determined using a single measurement of the laser signal.

However, this first approach is limited because (a) the different reflections are of significantly different intensities, yet the different reflections must still be captured simultaneously by the linear sensor array, (b) the different reflections often overlap each other on the sensors due to the angled approach, and (c) any angular variations or deformities of the plate surface will cause a shift on the linear sensor array. This can make it difficult to detect both reflections simultaneously. Furthermore, since the laser setup must be done in a way that both reflections can be observed simultaneously, it is difficult to design a single setup that accommodates variations in both the plate thickness and different objectives that vary in depth-of-field.

Figure 3:
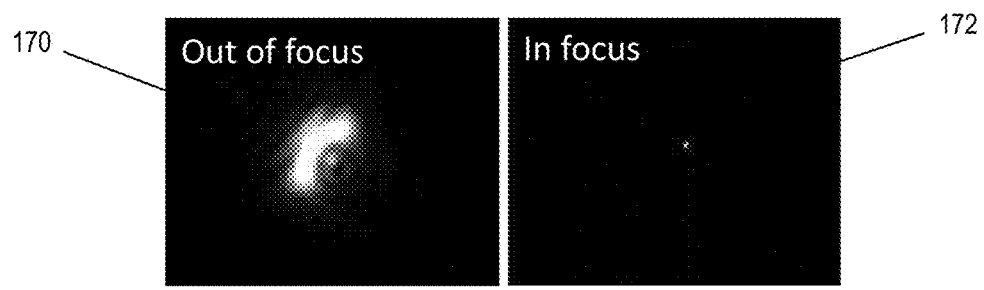
FIG. 3 is an image showing the difference between images that are out of focus and in focus.

In the second approach, reflections from the inner and outer surfaces are independently detected. To accomplish this, the reflection of the laser light through the imaging component is detected and analyzed using a sensor. As the reflection comes into focus, it gets smaller and the intensity increases, as shown in images 170 and 172 of FIG. 3. As a result, the system can detect when the interface comes into focus using the size and intensity measured by the sensor. The laser light can be made to be non-symetrical, e.g., by using a knife, which will cause the reflection to indicate which direction to move to attain focus. The laser reflection is measured by one or two large-area sensors, which measure the total intensity value of the reflection. This second approach does not predict the exact z-location of the sample with a single measurement—instead, a search algorithm is used to move the imaging component until the z-position of the surface is determined.

The second approach resolves many problems presented by the first approach, but still has a number of shortcomings. For example, since both reflections cannot be seen simultaneously, one cannot be certain which surface is causing the reflection.

For applications where both laser and software-based autofocus is applicable, the success rates of both LAF approaches discussed above have typically not been as effective as image-based autofocus approaches. However, for some applications an LAF approach may be the only valid option.

LAF methods and devices are presented herein that solve the above and other problems encountered by conventional autofocus systems. For example, using embodiments of the LAF solutions presented herein, multiple reflections can be detected independently, yet simultaneously. Additionally, ambiguities of the reflections are resolved, and the accuracy of the solutions is improved through the use of location, intensity, shape, and size of the reflections. Furthermore, in some embodiments the focus position can be estimated using a single measurement instead of using a search algorithm.

The solutions presented herein can provide additional speed, reliability, and robustness to autofocus methods and systems conventionally used by imaging devices. This is accomplished, at least in part, by imaging laser reflections using a high resolution camera, such as the same camera that is already being used in the system for imaging samples. By doing so, the laser reflections can be measured in high resolution with millions of sensors instead of just one or two sensors that only measure total intensity, as is done in conventional system. As a result desired reflection(s) can be observed simultaneously with other, out-of-focus (blurred) reflections. All of these reflections can be present in a given image, but each will have varying location, intensity, shape, and size. As a result, the reflections can be individually identified and the information of each reflection can be used to provide a robust estimate for the z-location of the sample that is invariant to the presence of multiple reflections.

Furthermore, by using a camera that provides a wider, higher-resolution sensor area, the LAF system can be designed so that the reflections move across the image as the z-position changes. The distance across the image can be made to be proportional to the z-distance from the reflection. As such, instead of relying mostly on the intensity, shape, and size of the multiple reflections, the location of the reflections can also play a key role in estimating the relative distance to each of the reflective surfaces. This allows a single measurement to be used to accurately determine the distance of the objective from the current z-location to the inner surface of the plate (and thus the sample), validation that the proper reflection is being focused upon, and the ability to handle cases where there are three or more reflections Embodiments disclosed or envisioned herein may comprise or utilize a special purpose or general-purpose computer including computer hardware, such as, for example, one or more processors, as discussed in greater detail below. Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmission media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., an "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, tablets, mobile telephones, PDAs, pagers, routers, switches, and the like. Embodiments may be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud." In this specification and in the following claims, a computer system is also defined to include imaging systems (e.g., imaging system 102 in FIG. 4).

Figure 4:
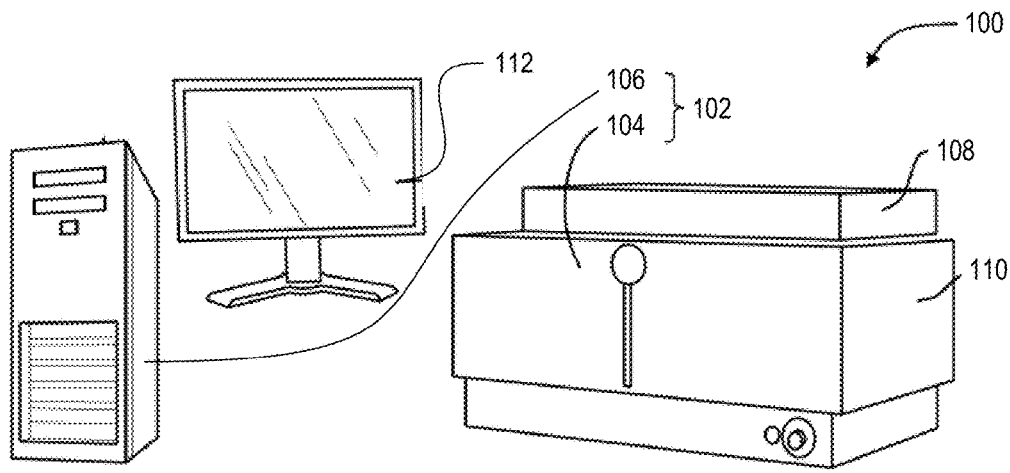
FIG. 4 illustrates an example embodiment of a system incorporating features disclosed or envisioned herein.

FIG. 4 illustrates an exemplary system 100 incorporating features disclosed or envisioned herein. At the heart of the system is a quantitative high-content cell imaging system 102 in which biological cells are scanned and analyzed. The exemplary cell imaging system 102 includes, but is not limited to, an imaging device 104 and a computing device 106.

Imaging device 104 comprises a stage housing 108 mounted on a microscope assembly 110. Stage housing 108 is configured to house the components required to position a specimen plate (such as, e.g., a 96-well plate) or a slide containing cells so microscope assembly 110 can image the cells to allow high content screening of the cells to be performed, as is known by one skilled in the art. Analyzing and storing of the data obtained from the imaging can be performed by imaging device 104 in conjunction with computing device 106.

Computing device 106 can be used as a controller for the system as well as for performing, by itself or in conjunction with imaging device 104, the analysis and/or storage of data obtained by imaging device 104. Computing device 106 can comprise a general purpose or specialized computer or server or the like, as defined above, or any other computerized device. Computing device 106 can communicate with imaging device 104 directly or through a network, as is known in the art. In some embodiments, computing device 106 is incorporated into imaging device 104.

System 100 can also include a user display device 112 to display results and/or system configurations. Imaging device 104 and/or computing device 106 can communicate, either directly or indirectly, with user display device 112.

The optical configurations generally arranged in imaging device 104 produce an enlarged image of cell(s) on a camera in order to record a high resolution image of the cell samples. In particular, the configurations discussed herein provide for a system that not only enables "wide-field" microscopy, as known to those skilled in the art, but also enables optical sectioning capabilities. This can include, e.g., standard confocal microscopy of a focused point or line of illumination scanned over a range of cells. These capabilities can be coupled with imaging algorithms which aid in providing the desired images as recorded by the camera.

In one embodiment, one or more of the method steps described herein are performed as a software application. However, embodiments are not limited to this and method steps can also be performed in firmware, hardware or a combination of firmware, hardware and/or software. Furthermore, the steps of the methods can exist wholly or in part on imaging device 104, computing device 106, and/or other computing devices.

An operating environment for the devices of the system may comprise or utilize a processing system having one or more microprocessors and system memory. In accordance with the practices of persons skilled in the art of computer programming, embodiments are described below with reference to acts and symbolic representations of operations or instructions that are performed by the processing system, unless indicated otherwise. Such acts and operations or instructions are referred to as being "computer-executed," "CPU-executed," or "processor-executed."

Figure 5:
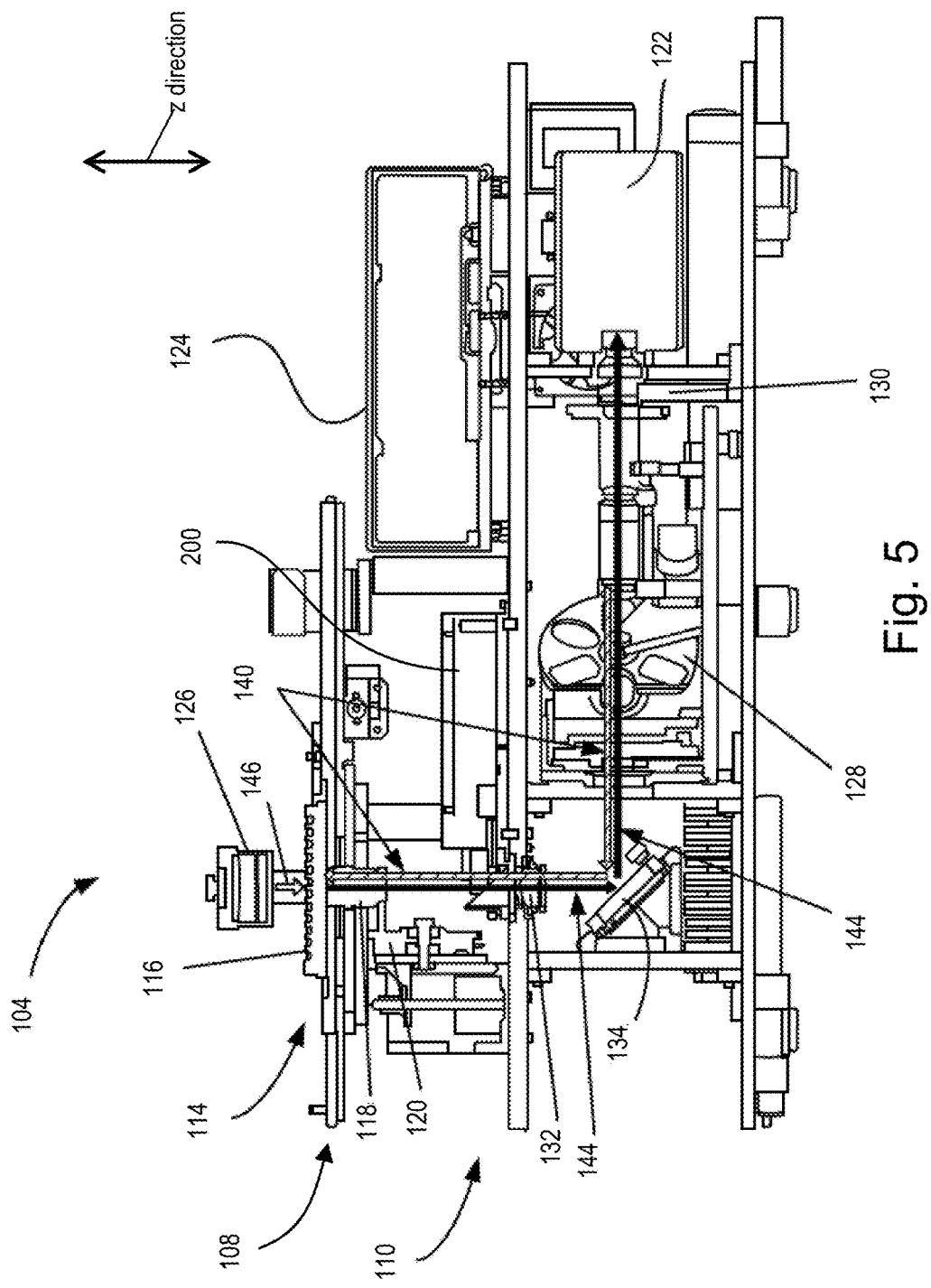
FIG. 5 is a cross sectional side view of a cell imaging device according to one embodiment.

FIG. 5 is an exemplary embodiment of imaging device 104. FIG. 5 displays a general cross-sectional side view of an interior platform design. In general, imaging device 104 integrates components required to position an HCS sample plate 116 containing biological cells so microscope assembly 110 can perform high content screening of the biological cells.

Stage housing 108 comprises a stage assembly 114 mounted in a manner so as to optically and mechanically cooperate with components that make up microscope assembly 110. Stage assembly 114 generally includes a stage on which HCS sample plate 116 can be positioned, as well as a stage positioning mechanism for selectively moving the stage for viewing, as is known in the art.

In the depicted embodiment, microscope assembly 110 houses an inverted microscope that can be used to perform screening of specimens on specimen sample plate 116 from underneath the specimens. The microscope includes an objective assembly 118 comprising a plurality of objectives, as is known in the art, to obtain magnified views of the specimens. Each objective can correspond to a different magnification level. In one embodiment at least three standard objectives are included. Additional objectives can also be included, if desired. Example standard objectives can include 10×/0.4 NA, 20×/0.45 NA and 40×/0.6 NA optical specifications. Example additional objectives can include 2×/0.08 NA, 4×/0.16 NA and 20×/0.7 NA optical specifications. Other magnification levels and objective types can also be used.

The microscope also includes a focus drive mechanism 120 mechanically coupled to microscope objective assembly 118. Objective assembly 118 can be moved up and down (i.e., in the z direction) with respect to stage assembly 114 via focus drive mechanism 120 so as to align and focus any of the objectives of microscope objective assembly 118 on the biological cells disposed within specimen sample plate 116. Focus drive mechanism 120 can be configured with a stepper motor and screw/nut combination that reduces anti-backlash to provide a resolution of, e.g., down to 0.006-μm/microstep to support the microscope objectives configured in imaging device 104.

Although the discussion herein is geared toward the use of an inverted microscope configuration, it is to be appreciated that a non-inverted microscope configuration can alternatively be used to perform screening from above the cells. Moreover, although microscope assembly 110 discussed herein is custom made, other conventional microscope configurations can be incorporated when desired, such as for example, an Axiovert 200M manufactured by Carl Zeiss MicroImaging, Inc. in Goettingin, Germany. In some embodiments, a microscope is not required at all.

Microscope assembly 104 also comprises various known components used to generate and record images of the specimens obtained through the objectives. These components can include, but are not limited to:

an image recorder 122 such as, e.g., a monochrome CCD or CMOS camera,
a fluorophore excitation source 124 such as, e.g., light engine comprising multiple light emitting diodes (LEDs),
optical filters that filter the excitation and emission lights, such as, e.g., a multi-position dichroic filter wheel 128 and a multi-position emission filter wheel 130, and
light directing devices that direct the excitation and emission lights through the microscope assembly, such as, e.g., a telan lens 132, a fold mirror 134 (e.g., a 90-degree fold mirror), and one or more light tubes.

One or more of the above components are typically controlled by the computing device 106 to allow for automated imaging. The optical configuration generally arranged in imaging device 104 can produce an enlarged image of cell(s) on image recorder 122 so that a high resolution image of the cell samples can be recorded. In particular, the configurations discussed herein provide for a system that not only enables "wide-field" microscopy, as known to those skilled in the art, but also enables optical sectioning capabilities.

In one embodiment, telan lens 132 is a Near-Infrared (NIR) enhanced lens (e.g., an Olympus Triplet) designed for enhanced performance of imaging device 104 over the full range of the visible spectrum from blue to NIR when using any of the configured objectives with desired emission wavelengths, to be discussed below.

For fluorescent analysis, fluorophore excitation source 124 produces an excitation light that illuminates the cells and causes the cells to induce a fluorophore emission light. For example, fluorophore excitation source 124 can be a multi-LED light engine that works cooperatively with configured excitation filters provided by dichroic filter wheel 128 and emission filter wheel 130, both of which can be computer driven to select a desired filter.

As a general method of operation, fluorophore excitation source 124 can be automatically or manually directed to provide multiple bandwidths of light ranging from violet (e.g., 380 nm) to near infrared (e.g., at least 700 nm) and are designed to excite fluorophores, such as, e.g., cyan fluorescent protein (CFP) and Far Red (i.e., near-IR) fluorophores.

Using system 100, fluorescent analysis of cells can be performed. To perform the analysis, stage assembly 114 first moves sample plate 116 to a position in which a desired particular segment of a micro-well or particular segment of a slide is in a given light path.

Figure 6:
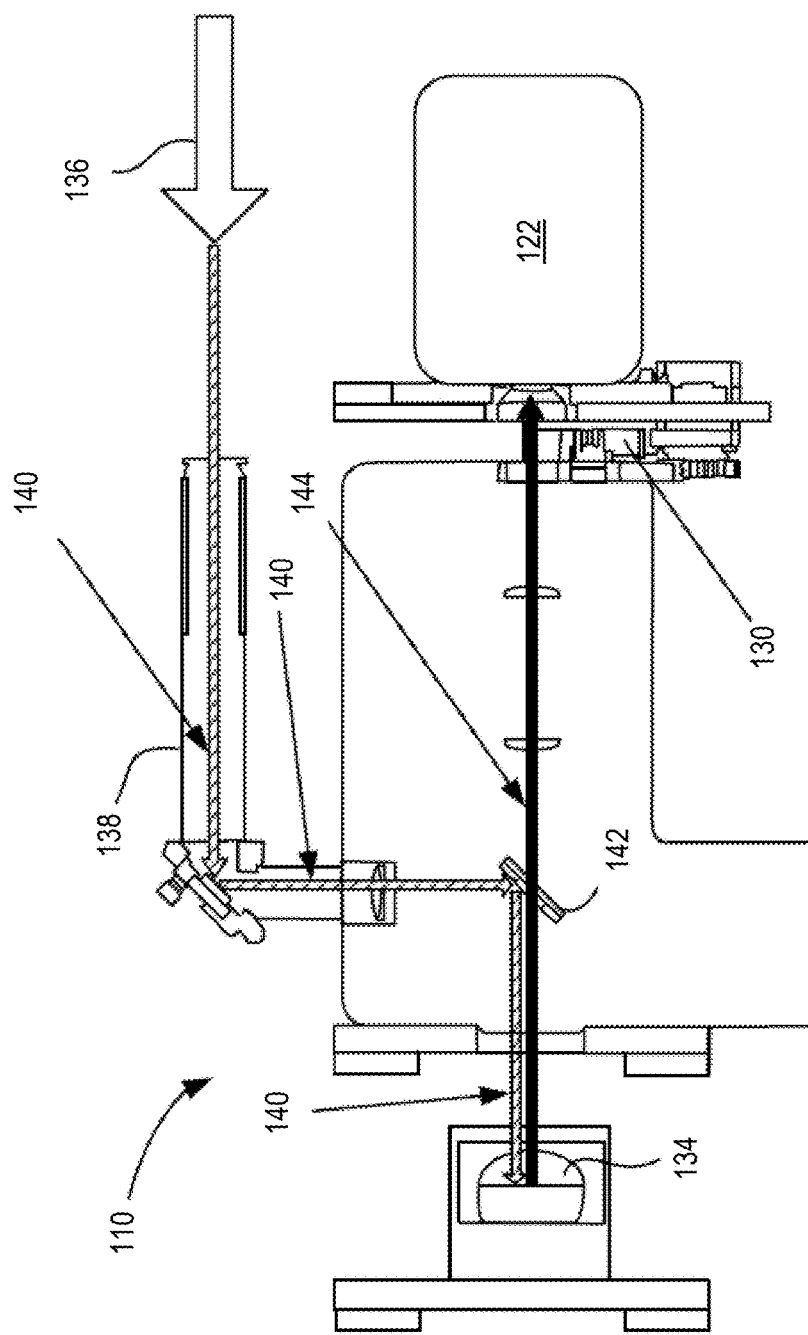
FIG. 6 is a cross sectional top view of the cell imaging device of FIG. 5, showing the flow of excitation and emission light through the device.

FIG. 6 is a top view depiction (as opposed to the side view of FIG. 5) that further illustrates the epifluorescent pathway of example components within microscope assembly 110.

As depicted in FIGS. 5 and 6, fluorophore excitation source 124 emits a desired system wavelength bandwidth as relayed by a fiber optic delivery system, (as shown by large directional arrow 136 in FIG. 6), dependent on the application with respect to the fluorescently labeled cells in sample plate 116. The excitation wavelength bandwidth is guided by an illumination adaptor 138 using various optics so as to be further directed along an excitation light path 140 (as denoted in FIGS. 5 and 6 by the arrows containing slashes) until received by a desired dichroic component 142 (shown in FIG. 6) disposed in the multi-position dichroic filter wheel 128. Dichroic component 142 is designed and automatically software selected for the particular bandwidth of wavelengths provided by fluorophore excitation light source 124. Dichroic component 142 directs the excitation light to 90-degree fold mirror 134. Thereafter, as shown in FIG. 5, the excitation light continues upward along excitation light path 140 through telan lens 132 and objective assembly 118 to the cells disposed in sample plate holder 116, as known to those of ordinary skill in the art.

The excitation light induces a fluorescence in the cells disposed in sample plate holder 116. The induced fluorescence is returned from the cells via the epifluorescent arrangement back along a path 144 (shown by the dark arrows in FIGS. 5 and 6) through objective assembly 118 and telan lens 132 until received by 90-degree fold mirror 134. As particularly shown in FIG. 6, fold mirror 134 directs the induced fluorescent light back to dichroic component 142, which allows the induced fluorescent light to continue back along path 144 through, e.g., additional optical components. The induced fluorescent light is then optically filtered by a configured filter arranged in emission filter wheel assembly 130 and the filtered induced fluorescent light is captured and recorded as an image via camera 122.

As shown in FIG. 5, to enable brightfield and chromophore imaging, microscope assembly 104 further comprises a transmission light assembly 126 positioned above sample plate 116. Transmission light assembly 126 illuminates samples in the transmitted light geometry shown in FIG. 5 with light sources, such as LEDs, having different colored wavelengths, e.g., blue, green, amber, & red, so that chromophores can be detected using image recorder 122 based on the differential absorption of the light by the chromophores. Transmission light assembly 126 also provides transmitted white light for brightfield imaging.

As shown in FIG. 5, microscope assembly 104 includes a laser autofocus (LAF) device 200 that provides a laser light that is used to determine the correct focal position of the objective with respect to a sample. LAF device 200 produces a laser light beam that is shined onto specimen sample plate 116 so as to produce reflections from the surfaces of the sample plate. The reflections are imaged by image recorder 122 and software methods are performed to determine the z-position of the objective with respect to the inner surface of the sample plate based on the image. The focus drive mechanism then moves the objective to a new z-position corresponding to the correct focal distance based on the original z-position determined for the objective. In some embodiments, the laser light beam and ensuing reflections are passed through the objective such that the laser light beam and corresponding reflections are offset from the center of the objective. In some embodiments, the reflections move across the image as the z-distance between the objective and the inner surface of the sample plate change.

Figure 7:
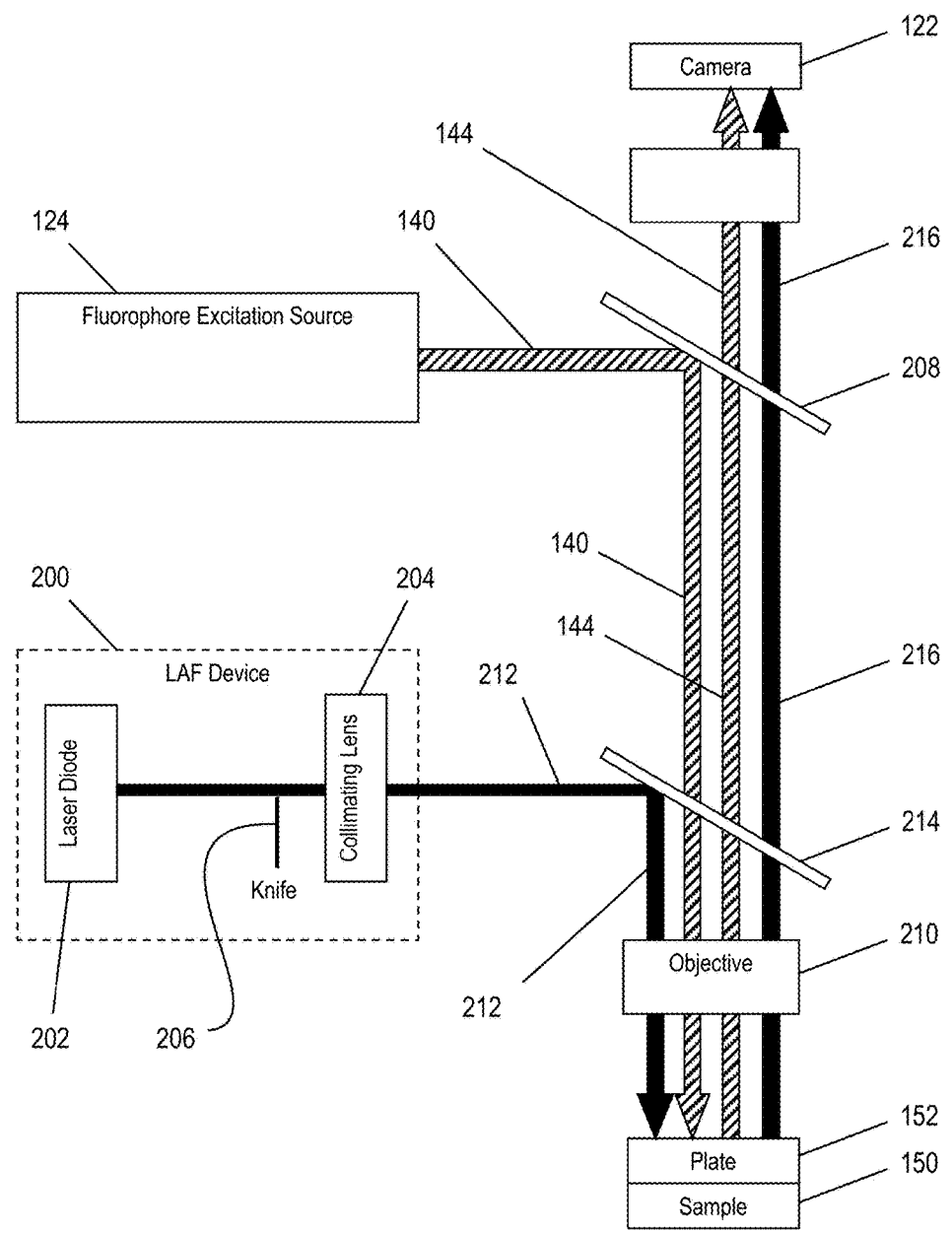
FIG. 7 illustrates an example embodiment of a system incorporating features disclosed or envisioned herein.

FIG. 7 is a block diagram that illustrates how the same camera used for fluorescence imaging can also be used by the laser autofocus system. As shown in the depicted embodiment, LAF device 200 comprises a laser-generating unit, such as a laser diode 202, to generate the laser light and optics, such as a collimating lens 204, to align and focus the laser light generated by the laser-generating unit into a laser light beam. A blocking device 206, commonly known as a "knife", can also be included to block a portion of the laser light beam emitted by LAF device 200 to cause reflections of the laser light beam to be non-circular. This allows a non-symmetrical reflection to be generated, which can provide more information to aid in focusing.

For example, if one side of the laser light beam is blocked, the laser light beam emitted by LAF device 200 and the reflections based thereon will have "D" cross sectional shapes. This can be used to determine focusing information in one way that a circular cross sectional shape cannot. When the reflection is out of focus, a "D" shape will be generated. Due to optical properties, the "D" shape will extend in one direction when the focal distance is too short and in the opposite direction when the focal distance is too long. That is, the "D" shape will "flip" as the correct focal length is passed.

Although LAF device 200 discussed herein is custom made, other conventional LAF devices can also be used as LAF device 200. Some examples include: the Definite Focus manufactured by Carl Zeiss MicroImaging, Inc in Goettingin Germany the LF210 Laser Autofocus System manufactured by Prior Scientific, Inc. of Rockland, Mass., and the AF910 Autofocus Sensor manufactured by Quantum Composers, Inc. of Bozeman, Mont.

As illustrated in FIG. 7 and generally discussed above, during fluorescent imaging of samples, fluorophore excitation source 124 emits a desired system wavelength bandwidth that is guided along excitation light path 140 through one or more dichroic components, e.g., dichroic mirror 208, and through objective 210 to sample 150 disposed on sample plate 152. The fluorescence induced in sample 150 by the excitation light is returned from sample 150 back through objective 210 and along fluorescence return path 144, a portion of which coincides with excitation light path 140. Fluorescence return path 144 and excitation light path 140 diverge at some point due to a dichroic component, e.g., dichroic mirror 208 or the like, that allows only one of the excitation light and the induced fluorescent light to pass through while reflecting the other one. The induced fluorescent light continues along return path 144 to camera 122, where it is captured and recorded as an image.

During autofocusing, LAF device 200 emits a laser light beam that is guided along laser light path 212 through one or more dichroic components, e.g., dichroic mirror 214, until laser light path 212 is made to coincide with excitation light path 140. The laser light beam is directed through objective 210 toward sample 150 disposed on sample plate 152. As discussed above, the inner and outer surfaces of plate 152, as well as possibly other surfaces, reflect the laser light beam. These reflections are returned back through objective 210 and along a reflection return path 216. Reflection return path 216 coincides with fluorescence return path 144 used by the induced fluorescent light. As such, the reflections arrive at camera 122, where they are captured and recorded as an image, similar to the induced fluorescent light.

As noted above, the laser light beam can be offset from the center of objective 210 when it passes therethrough. This can result in the returned reflections also being offset from the center of objective 210, but on the opposite side. As a result, the reflections can appear at different lateral locations on the image and can move across the image as the z-distance between the objective and the surfaces change. This can be used to help determine the z-positions of the surfaces corresponding to the reflections.

Using the camera of the HCI system as the image recorder for the LAF device provides a number of benefits. Because the camera is already within the HCI system, no additional camera is necessary, providing an economical benefit. Additionally, no additional calibration steps are required.

In an alternative embodiment, a camera separate from the HCS camera can be used. Although less economical, using a separate camera can provide other benefits. For example, doing so may speed up the round trip between the z motor, the camera, and the positioning methods. This can be accomplished in several ways—including using a video rate camera, hardware triggers between hardware and the camera, or using an integrated camera directly coupled with the laser autofocus unit. In addition, a separate imaging path and detector could be implemented specialized for the specific wavelength of the laser.

Furthermore, although the above discussion has been directed to using an LAF device with an HCI system, it should be appreciated that LAF devices similar to those discussed above can also be used with other types of sample imaging systems. For example, the LAF devices discussed or envisioned above can also be used with general purpose microscopes and low-content imaging systems such as plate readers. Other systems can also incorporate the LAF devices. The same applies for the methods discussed below.

Figure 8:
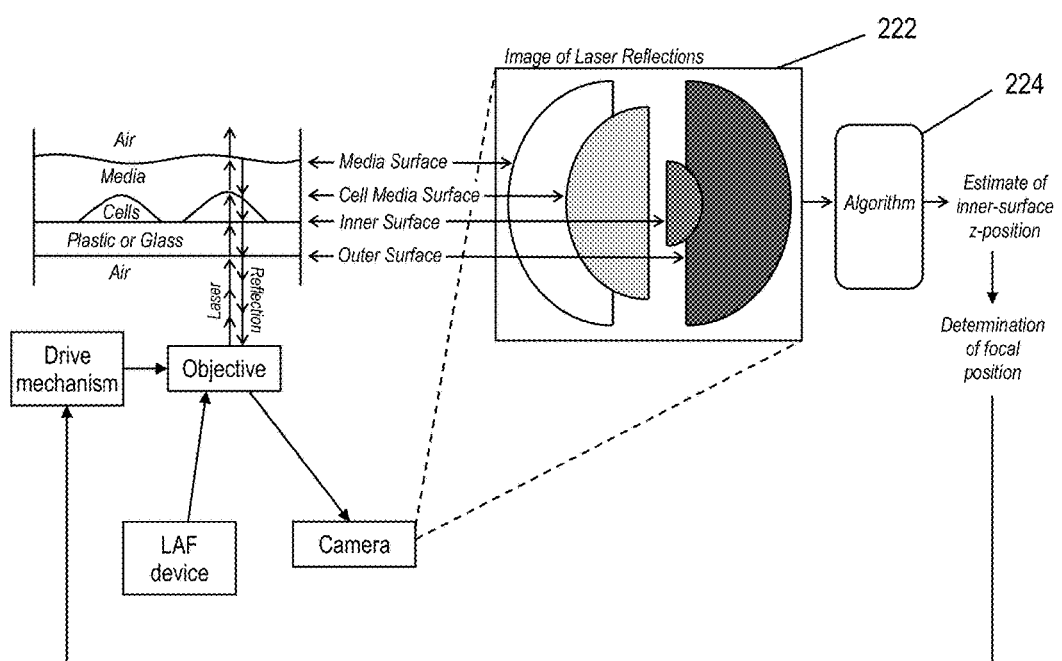
FIG. 8 illustrates a method of focusing a sample using a laser autofocus device according to one embodiment.

FIG. 8 illustrates a method of autofocusing a sample using a laser autofocus device according to one embodiment. The LAF device emits a laser beam that is shined toward the sample, e.g., in a manner discussed above. As the laser beam strikes various surfaces (e.g., the inner and outer surfaces of the plate, the cell/media interface surface, and the media surface), the light is reflected through an imaging component (e.g., a microscope objective), to a camera, e.g. in the manner discussed above. An image, such as, e.g., image 222, is produced of the reflections by the imaging component. The image is processed using one or more software algorithms 224 to determine information used for focusing the sample, including, e.g., identifying each reflection in the image, determining the surface each reflection relates to, and estimating the z-position of the imaging component with respect to any of the surfaces represented by the reflections. The information is used to determine the desired focal position for the imaging component, e.g., the z-position of the objective, for the sample to be in focus. Finally, the drive mechanism moves the imaging component to the desired focal position.

As discussed in more detail below, one embodiment uses image processing algorithms to project the image onto a line, and then identify the peaks of the projection to identify the number and location of the multiple laser reflections on the line. Based upon the identification results, each blob in the image (where each blob is a detected reflection) is measured for its location, intensity, shape, and size. Based upon the relative size, intensity, and location of each blob, the software can predict where the objective is relative to the inner surface, and thus relative to the sample.

Figure 9:
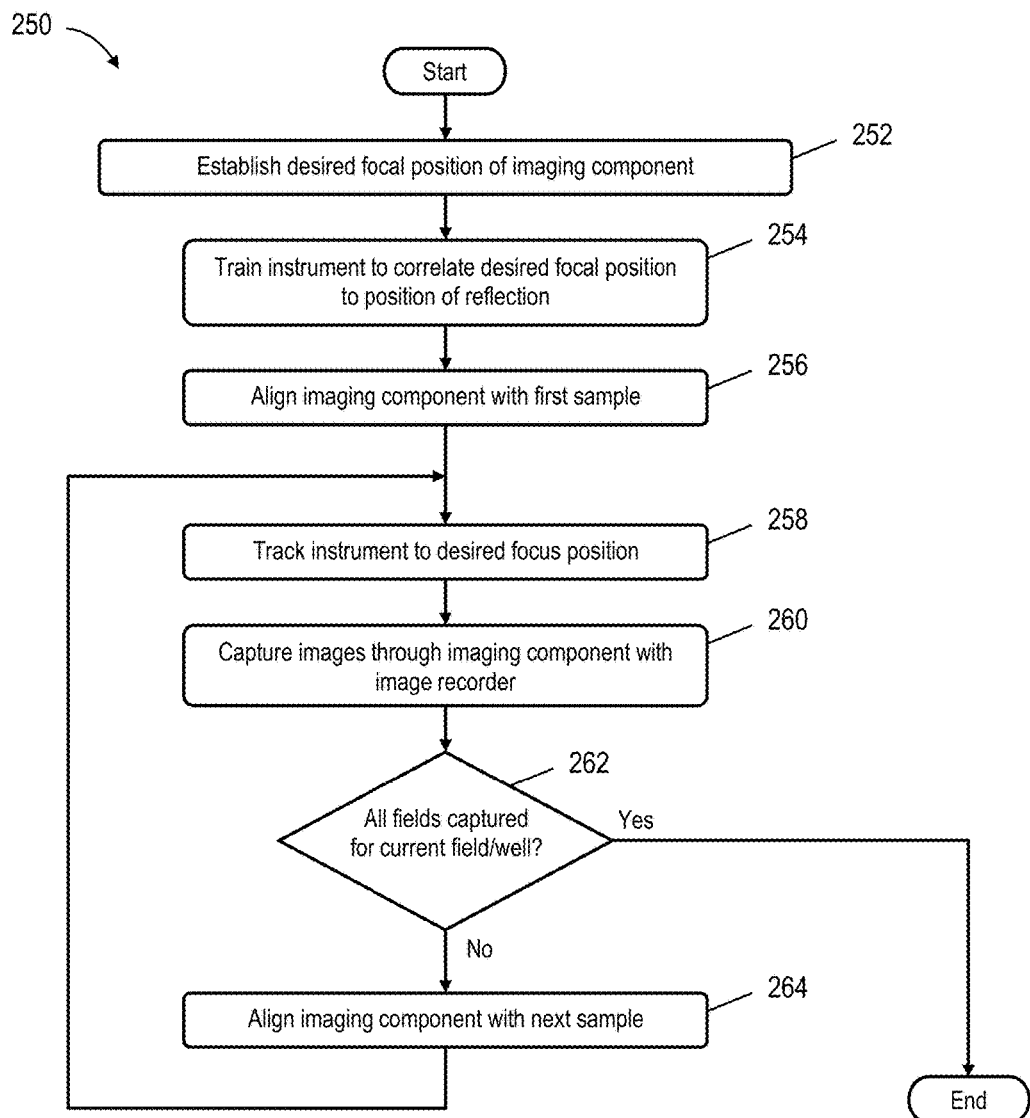
FIG. 9 illustrates a method of imaging samples in a high content imaging system according to one embodiment.

FIG. 9 illustrates a method 250 of imaging samples using a high content imaging (HCI) system according to one embodiment. The method can also be adapted to be used for other types of systems. Method 250 comprises steps 252 to 264.

In step 252, the desired focal position of the imaging component with respect to a sample is established. In one embodiment, a user manually manipulates an objective to move in the z direction until the sample positioned on the plate is in focus. In another embodiment movement of the objective is controlled by a computer device which determines when the sample is in focus. In one embodiment, the z direction is vertical and the objective is moved up and/or down. In one embodiment, the user views the sample through the objective to determine when the sample is in focus. In one embodiment, the user views a recorded image of the sample taken through the objective to determine when the sample is in focus.

In step 254, once the desired focal position of the imaging component has been established, the system is trained to correlate a location on an image of a reflection of an LOA device to the desired focal position. In one embodiment the desired focal position is determined using reflections of the laser beam captured by the camera. In one embodiment, the desired focal position is directly related to the position of a reflection of an inner surface captured by the camera.

In step 256, once the system has been trained, the imaging component is aligned in the z-direction with the first sample to be imaged. In one embodiment, the plate or objective is moved horizontally to align the objective with the first field or well to be imaged, as is known in the art.

In step 258, once the imaging component has been aligned with the sample to be imaged, the imaging component and/or sample is/are moved in the z-direction to produce a reflection in the same location corresponding to the desired focal position. In one embodiment, the objective is moved in the z direction to a new focal position that results in the desired focal distance. As discussed below, in one embodiment the new focal position can be determined using reflections of the laser beam imaged by the camera.

In step 260, once the imaging component and/or sample have been moved to the desired z-positions, one or more images of the sample are captured through the imaging component with a recording device. In one embodiment, the images are captured through the objective using a camera in a manner known in the art.

As indicated by decision step 262, if more samples are desired to be imaged, the method proceeds to step 264. Otherwise, the method ends. In one embodiment, each sample corresponds to a different field in a well. In one embodiment, each sample corresponds to a different well in a plate.

In step 264, the imaging component is aligned in the z-direction with the next sample to be imaged. In one embodiment, the plate or objective is moved horizontally to align the objective with the first field or well to be imaged, as is known in the art.

Once the imaging component has been aligned with the next sample to be imaged, steps 258 and 260 are repeated for the sample. This continues until all of the desired samples have been imaged. As such, steps 256 and 258 are repeated until all desired samples have been imaged.

Figure 10:
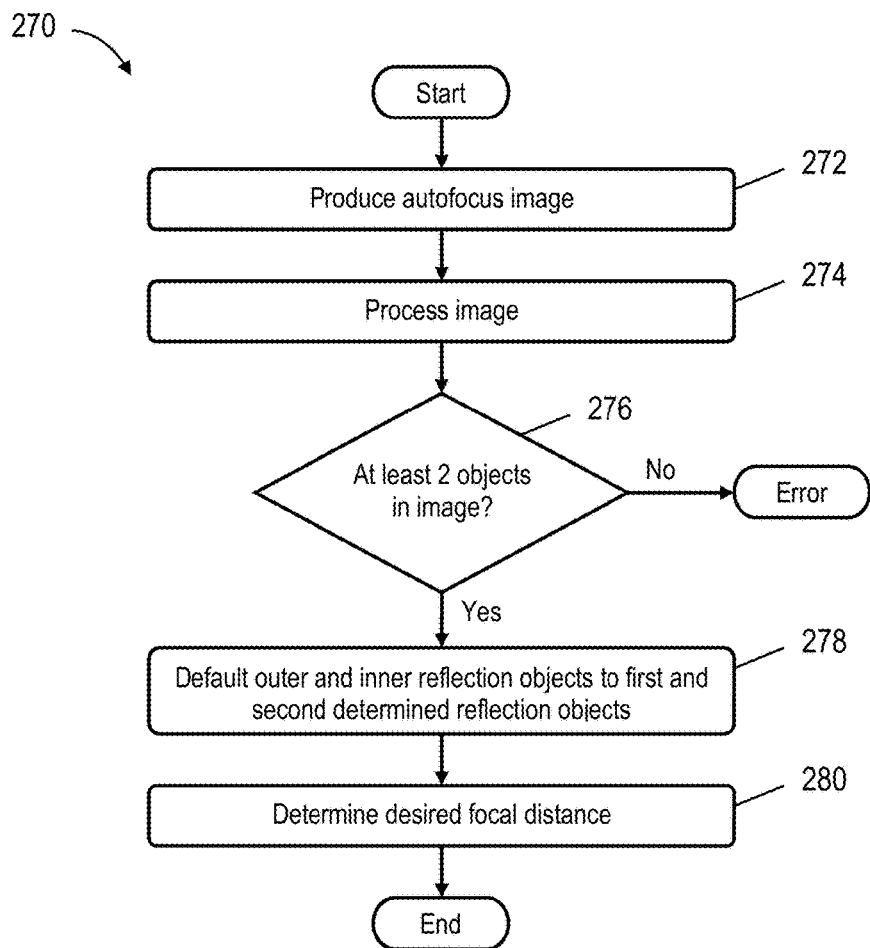
FIG. 10 illustrates a method of determining information for a training image according to one embodiment.

FIG. 10 illustrates a method 270 of determining the desired focal distance according to one embodiment. Method 270 can be used, e.g., for step 254 of method 250. Method 270 comprises steps 272 to 280.

In step 272, an autofocus image is produced. In one embodiment this comprises shining the laser beam from the LAF device onto the plate so as to cause reflections of the light from various surfaces to pass through the imaging component and be recorded by the recording device. In one embodiment, the light is reflected at least from the inner and outer surfaces of the plate through an objective, and the reflections are recorded by a camera, e.g., in the manner discussed above. An image showing one or more reflections is obtained, e.g., similar to image 222 shown in FIG. 8 or image 230 shown in FIG. 12. The image can be stored on a storage device, such as computer memory or the like, as is known in the art.

In step 274, the autofocus image is processed to determine the number of objects therein as well as information regarding each object. One manner of doing so is discussed below.

As indicated by decision step 276, if at least two objects are found in the image, the method proceeds to step 278. Otherwise, an error has occurred and further images may need to be obtained and processed.

In step 278, the reflections from the outer and inner surfaces of the plate are respectfully equated (defaulted) to the first and second determined objects of the image.

In step 280, the desired focal distance is determined. In one embodiment the desired focal distance is the distance between the objective and the inner surface of the plate and is calculated in part on the information obtained from the second object of the image.

Figure 11:
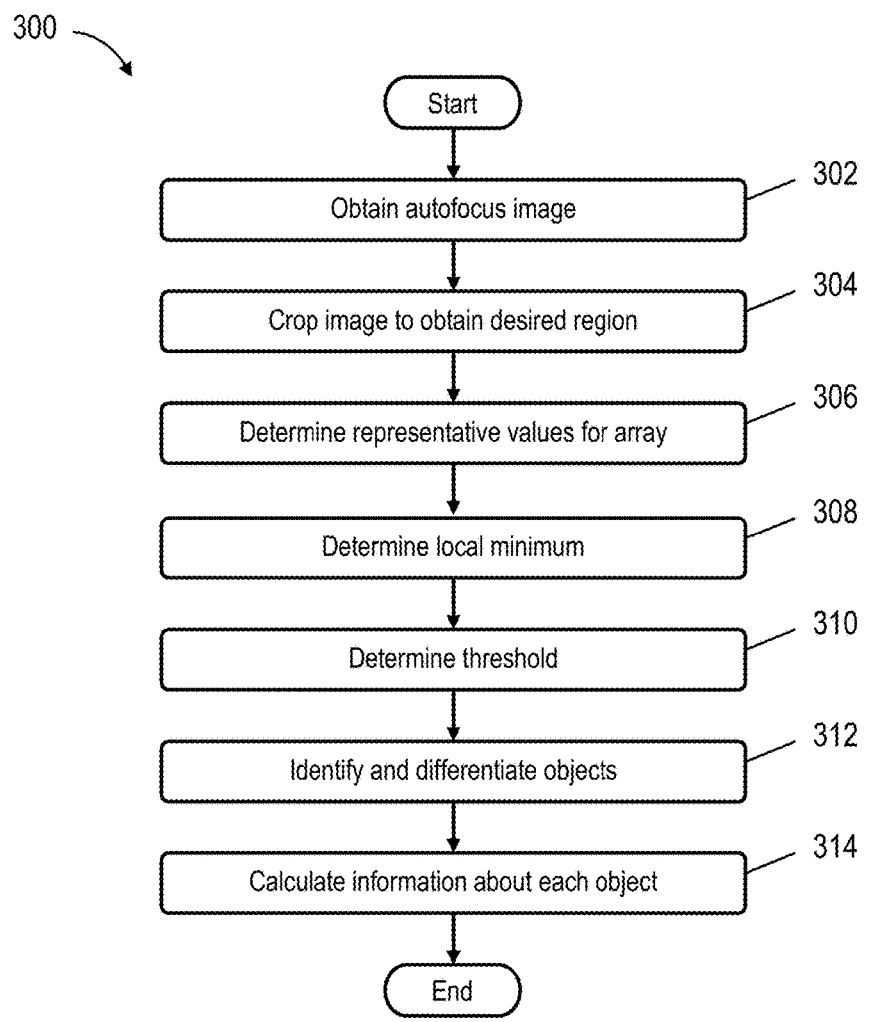
FIG. 11 illustrates a method of processing an autofocus image according to one embodiment.

FIG. 11 illustrates a method 300 of processing an autofocus image, according to one embodiment, to determine the number of reflection objects (or blobs) therein and information regarding each object. In method 300, image processing algorithms are used to project the autofocus image onto a line, and then identify the peaks of the projection to identify the number and location of the multiple laser reflections. Based upon the identification results, each blob in the image (where each blob is a detected reflection) is measured for its location, intensity, shape, and size. Based upon the relative size, intensity, and location of each blob, the z-position of the objective relative to the inner surface can be estimated. Method 300 can be used, e.g., for step 274 of method 270. Method 300 comprises steps 302 to 314.

Figure 12:
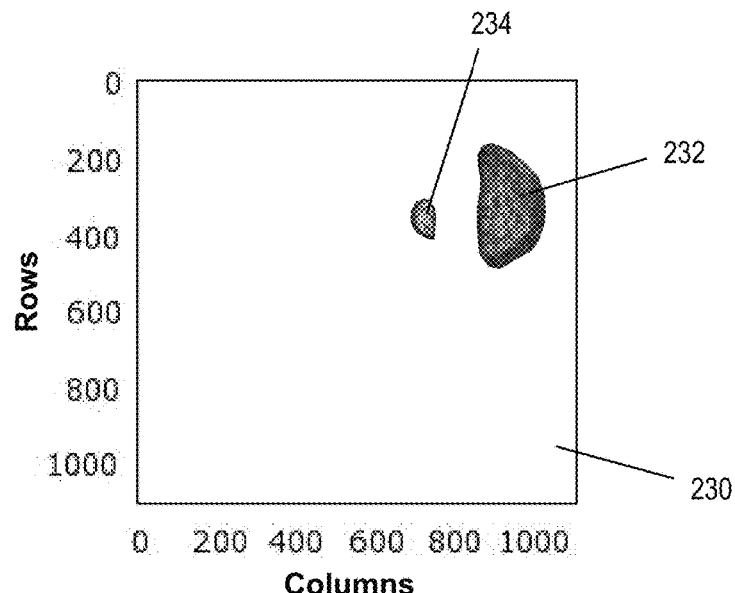
FIGS. 12 and 13 are sample images obtained using methods described herein.

In step 302, an autofocus image is obtained, either directly from the camera or from the storage device. Autofocus image 230 shown in FIG. 12 is an example of one such image obtained using the present embodiment. Image 230 contains approximately one megapixels in about 1100 rows and about 1100 columns. Each row/column position corresponds to a single pixel of the image. As shown in FIG. 12, two objects 232 and 234 are shown at the upper right of autofocus image 230 between rows 100 and 500 and between columns 700 and 1100. Objects 232 and 234 respectfully represent first and second reflections of the laser beam light reflected from the outer and inner surfaces of the plate. In one embodiment, the image is obtained in a serial stream from the camera or computer device. For example, the image can be obtained one row at a time, starting with the first row.

Figure 13:
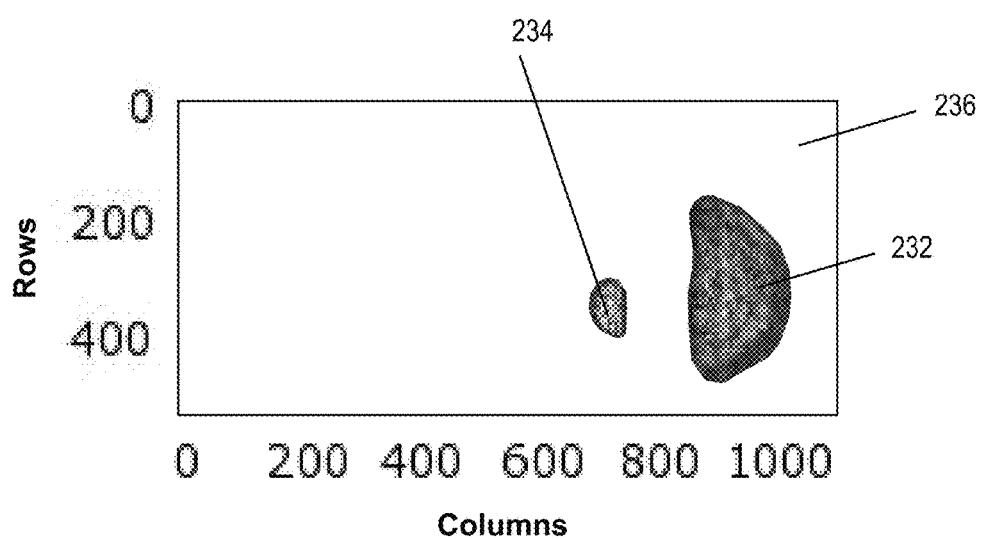

In step 304, the obtained autofocus image is cropped to obtain a desired region and to remove one or more portions of the image that are unrelated to the autofocus objects. For example, image 230 can be cropped to remove the bottom half of the image and obtain the region 236 shown in FIG. 13. Removing unrelated portions of the image gets rid of any objects within those portions so that those objects are not erroneously used in the focusing calculations. The region of the image to use can be determined during a calibration of the system performed previously. It can depend on the location within the objective that the laser light reflections pass, among other things.

In step 306, a representative value for each column of the image is determined and stored in a linear array. Each location of the array corresponds to one of the columns. For example, for region 236, a linear array of about 1100 was used, with each location in the array corresponding to a separate column. In one embodiment the representative value for a column is the maximum intensity value of any pixel in the column. In one embodiment the representative value is the aggregate intensity of all of the pixels in the column.

Figure 14:
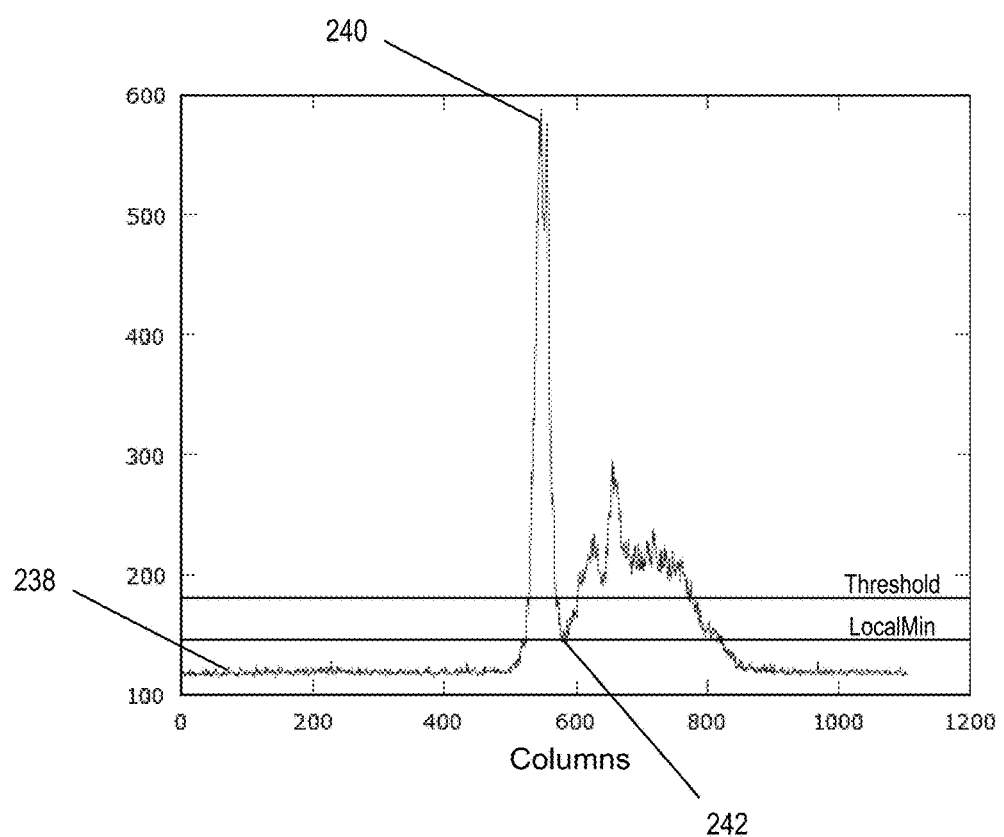
FIG. 14 is a projection of maximum intensities for each column corresponding to FIG. 14.

In an example using image 236, each location of the array was populated with the maximum intensity value found in the corresponding column. The resulting values have been plotted to obtain the graphical projection 238 shown in FIG. 14. As shown in FIG. 14, the highest intensity value of almost 600 was observed at approximately column 550 of projection 238 with a number of other intensity peaks occurring at columns 560, 620, 640, 720, etc. Valleys occur between the intensity peaks on projection 238. The widths of the peaks and valleys vary. A constant "noise" intensity level of about 125 was constant over all the columns of the projection.

In light of the above, although image 236 includes two objects 232 and 234 respectfully representing first and second reflections, the representative array values graphed in FIG. 14 have many intensity peaks and valleys, making it difficult to determine how many separate reflection objects are present, let alone any information about each object. As such, steps 308 to 312 are included to help to differentiate between the objects.

In step 308, a local minimum between objects is determined and the intensity value for the local minimum is obtained. It is first assumed that the highest intensity value corresponds with either the first or second reflection objects. For example, for projection 238, one of the reflection objects is assumed to include column 550, which has the highest intensity value.

In one embodiment, potential local minimums are first determined. Potential local minimums are the lowest intensity values of the first valleys of the projection that are at least a predetermined number of columns wide (hereinafter "predetermined width") and at least a predetermined number of columns (hereinafter "predetermined distance") to the left and right from the highest intensity column. For example, if the predetermined width and distance were respectively 25 and 30, a first potential local minimum for projection 238 would be 140 at location 590 to the right of the highest intensity column. A second potential local minimum can also occur to the left of the highest intensity column, although one is not found on projection 238.

The local minimum is determined to be the largest value of the potential local minimums. For example, the local minimum for projection 238 is 140 as indicated by the LocalMin line.

In step 310, once the local minimum is determined, a threshold intensity is determined. The threshold intensity is used for determining columns that correspond to reflection objects, as discussed below. The threshold intensity is set to be at a higher value than the local minimum so that a clear differentiation can be made between objects. In one embodiment, the threshold intensity is obtained by simply adding a predetermined threshold adjustment value to the intensity local minimum value. For example, if the predetermined threshold adjustment value is 40, the threshold intensity is 180 (140+40), as indicated by the Threshold line in FIG. 14.

In step 312, the reflection objects are identified and differentiated using the threshold intensity. In one embodiment, small gaps are closed between intensity peaks of the projection to remove the valleys and to smooth the curve. In one embodiment, if a column distance between adjacent peaks is less than a predetermined value, the intensity values of the columns between the peaks are given new values between the intensity values of the adjacent peaks. In one embodiment, the columns between the peaks are given the intensity value of the lowest peak.

Once the reflection has been smoothed, the threshold intensity is applied to each column to produce a binary array; if the intensity value for the column of the projection is greater than or equal to the threshold intensity, the binary array location corresponding to that column is set to 1; otherwise, the binary array location is set to 0. Each portion of the binary array having repeating 1's potentially corresponds to an object.

Once the binary array has been populated, a threshold object width is applied to the array to remove potential objects that are too small. Potential objects in which the number of repeating 1's is less than the threshold object width are removed (i.e., the corresponding array locations are reset to 0). What is left in the array correspond to objects that have widths that are at lease the threshold object width wide, separated by zeros in the array.

Each reflection object in the binary array is then identified, including the columns that make up the object. The reflection objects are typically identified as first through $n^{th}$ objects beginning with the right-most object.

In step 314, information is calculated for each object. This information can include the column centroid of the object, the average intensity, the peak intensity, etc. To do this, the original image is once again used. For example, the intensity values for each column identified in step 312 to be part of the image can be used to determine the centroid of the image. In one embodiment, the intensities of all of the columns for the image are used to determine an intensity-weighted column for the image, similar to a center-of-mass calculation. In another embodiment, only the values above the threshold are used to determine the intensity-weighted column. The centroid is then used to represent the location of the reflection object. The information for each object can be saved.

Figure 15:
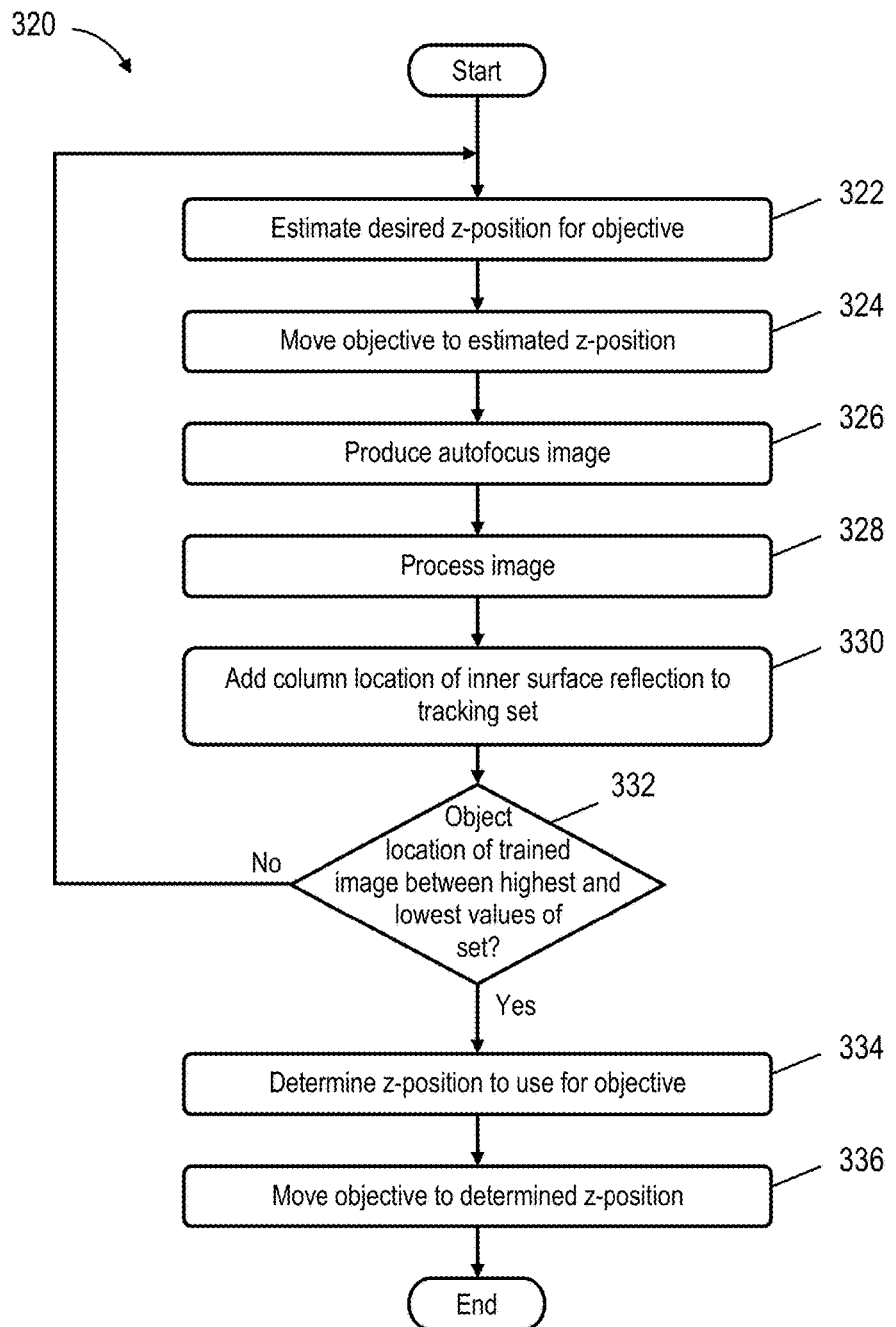
FIG. 15 illustrates a method of tracking an imaging component to a desired focal position according to one embodiment.

FIG. 15 illustrates a method 320 of tracking an imaging component to a desired focal position. The desired focal position corresponds to the z-position that results in the sample being in focus. Method 320 can be used, e.g., for step 258 of method 250. Method 320 comprises steps 322 to 336.

In step 322, the desired z-position is estimated for the objective, based on values determined at training as well as results from values used during the present method. The goal is to place the objective at a z-position that produces a reflection image of the inner surface at the same column location as that of the training image.

In step 324, the objective is moved, e.g., by the drive mechanism, to the desired z-position, as is known in the art.

In step 326, an autofocus image is produced as discussed above (see, e.g., step 272 of method 270).

In step 328, the autofocus image is processed to determine the number of objects therein as well as information regarding each object, e.g., in the manner discussed above.

In step 330 the column location of the inner surface reflection of the autofocus image is added to a set of such column locations for the tracking process. If it is the first time through step 330 for the present tracking method, the column location set will only include this first column location.

As reflected in decision step 332, if the column location of the inner surface reflection of the trained image is between the highest and lowest values of the column location set, the method proceeds to step 334. Otherwise, the method returns to step 322 to perform steps 322-330 again. Each time step 322 is performed, a new desired z-position can be better estimated using the column location set that is added to each time through the loop.

In step 334, once the column location of the inner surface reflection of the trained image is between the highest and lowest values of the column location set, the z-position to use for the objective (i.e., the focal position) is determined. In one embodiment, the focal position is interpolated using the highest and lowest values of the column location set with respect to the trained image. In another embodiment, the focal position is interpolated using three values: a first value of the column location set closest to the column location of the inner surface reflection of the trained image, and the two values of the column location on either side of the first value.

In step 336, the objective is moved, e.g., by the drive mechanism, to the focal position to be used for imaging, as is known in the art.

Figure 16:
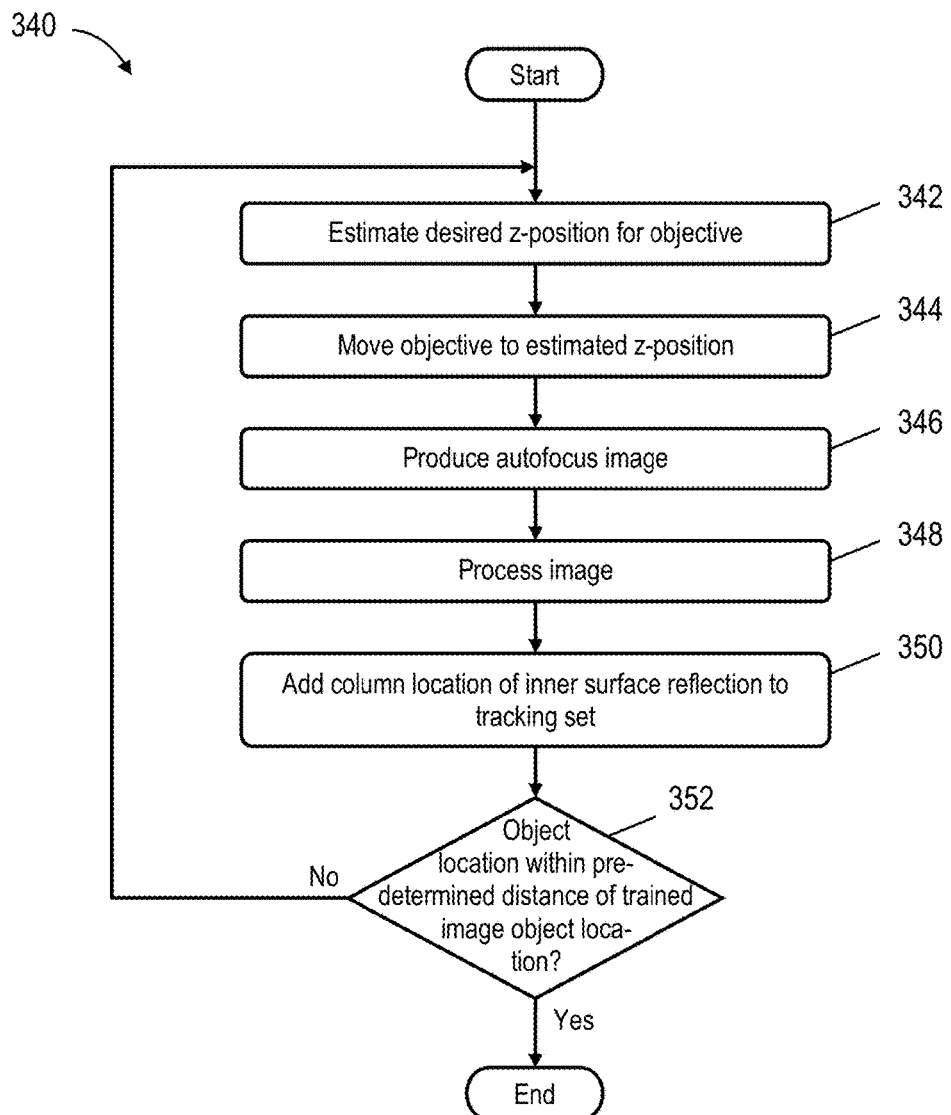
FIG. 16 illustrates a method of tracking an imaging component to a desired focal position according to another embodiment.

FIG. 16 illustrates another method 340 of tracking an imaging component to a desired focal position. Method 340 comprises steps 342 to 352.

Method 340 is similar to method 320 except for the manner in which it is determined that the loop can be exited. As such, steps 342, 344, 346, 348, and 350 respectively correspond to steps 322, 324, 326, 328, and 330 of method 320. As reflected in decision step 352, however, if the column location of the inner surface reflection of the autofocus image is within a predetermined column distance away from the column location of the inner surface reflection of the trained image, the focal position has been obtained. Since the objective is already at the focal position, it does not have to be moved there.

Figure 17:
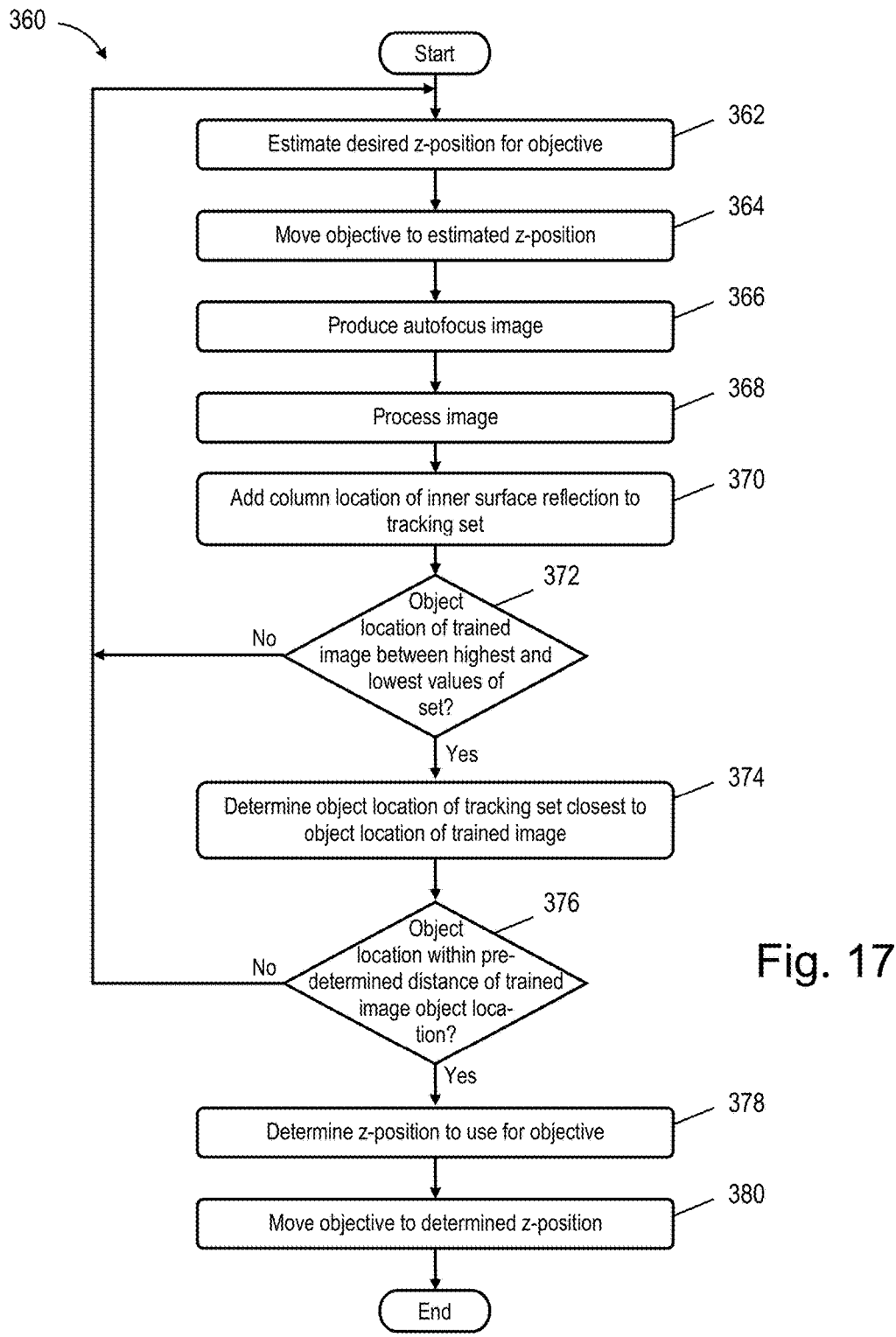
FIG. 17 illustrates a method of tracking an imaging component to a desired focal position according to another embodiment.

FIG. 17 illustrates another method 360 of tracking an imaging component to a desired focal position. Method 360 comprises steps 362 to 380.

Method 360 is also similar to method 320 except that not only does the column location of the inner surface reflection of the trained image need to be between the highest and lowest values of the column location set, one of the values of the column location set also needs to be close to the column location of the inner surface reflection of the trained image.

As such, steps 362, 364, 366, 368, 370, and 372 respectively correspond to steps 322, 324, 326, 328, 330, and 332 of method 320. When it is determined that the column location of the inner surface reflection of the trained image is between the highest and lowest values of the column location set, the method continues to step 374.

In step 374, the value in the column location set is determined that is nearest to the value of the column location of the inner surface reflection of the trained image.

As reflected in decision step 376, if the value determined in step 374 is within a predetermined amount from the column location of the inner surface reflection of the trained image, the method proceeds to step 380. Otherwise, the method returns to step 362 to perform steps 362-374 again.

In step 378, once one of the values in the column location set is within a predetermined amount from the column location of the inner surface reflection of the trained image, the z-position to use for the objective (i.e., the focal position) is determined. In one embodiment, the focal position is interpolated using the value determined in step 374 and another value within the column location set.

Figure 18:
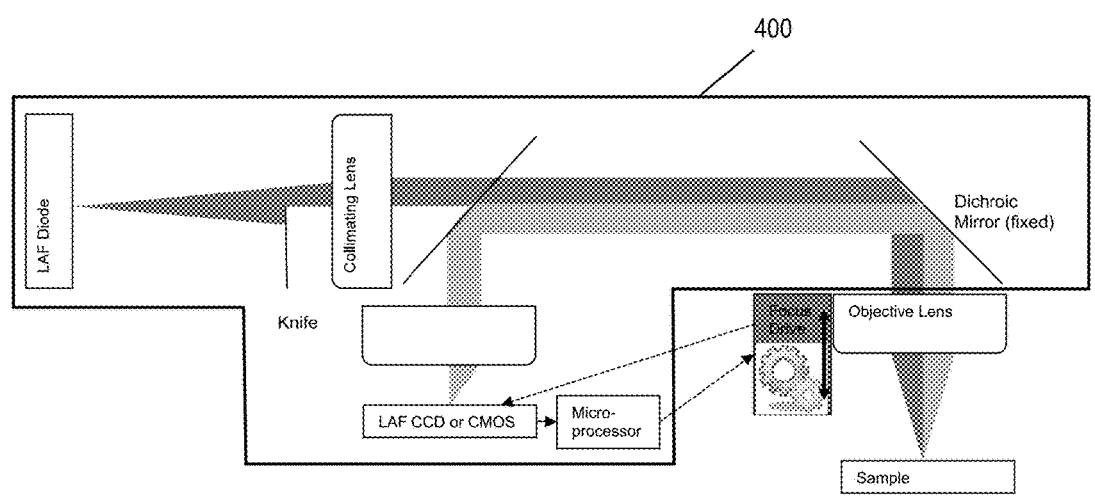
FIG. 18 illustrates a standalone LAF system according to one embodiment.

FIG. 18 is another embodiment of an LAF device 400. LAF device 400 is a standalone unit that can be plugged into an HCI imager, e.g., in a traditional slot therein. A standalone LAF device can integrate with any system which has an open slot in the emission path, or through the shared motorized dichroic of the fluorescence excitation path.

Similar to the non-standalone LAF device, the standalone LAF device includes laser light producing elements, such as a laser diode, a knife, and a collimating lens. In addition, standalone LAF device 400 can also include a dichroic element to reflect the laser light toward the plate, a camera, such as a CCD or CMOS camera, to record the laser reflections, and a computer device, such as a microprocessor, to control the LAF device. Benefits can include (a) having a dedicated processor for the LAF device, (b) an increase in speed due to a direct coupling with the motor controller (such as a hardware trigger to indicate the motor has completed its move), and (c) the LAF image recorder can be operated at higher speeds (such as video-rate speeds) than the imaging camera of HCI devices.

In one embodiment, a search algorithm can be included to iteratively improve the z-position estimates. The search can produce iterative estimates of the best z position and the final estimate can be a weighted average of the results from the iterative estimates. The final estimate can be less prone to errors caused by laser intensity variation, vibration, imperfections in the plastic at the location of the reflection, etc.

In one embodiment, a machine-learning approach can be used. In this approach, a training set of laser images is presented for the current experiment (objective, plate type, and sample). The system trains on these images so that when a new laser autofocus image is presented, the system can produce an estimate of the distance of to the inner surface (and thus to the sample). Benefits of this embodiment include (a) image processing is not required to identify the location and number of reflections, thus reducing potential errors; (b) the training algorithm can effectively decide how to weight the importance of the location, intensity, shape, and size with respect to the output z-position estimate; and (c) texture qualities of the different reflections can be included in the algorithm, which can add an additional level of stability since the reflections from each reflective surface typically have slightly different optical qualities.

It is to be understood that features described with regard to the various embodiments herein may be mixed and matched in any combination without departing from the spirit and scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of focusing, by an HCI system, a biological sample positioned on a plate, the plate having inner and outer surfaces, the HCI system having an imaging component and a camera for imaging biological samples, the method comprising:
    at a first z-position of the imaging component and without moving the imaging component from the first z-position, shining a laser light beam through the imaging component toward the plate to cause reflections of the laser light from the inner and outer surfaces of the plate to pass back through the imaging component and to the camera;
    producing, by the camera, an image of the received reflections at the first z-position, the image comprising a plurality of pixels organized into a plurality of columns;
    processing the image by a computerized device to estimate a z-distance between the imaging component and the inner surface of the plate, wherein processing the image comprises:
        determining representative values for each column of the plurality of columns;
        populating a linear array with the representative values;
        identifying and differentiating two or more objects from the linear array, the two or more objects corresponding to the received reflections at the first z-position;
        based on the identified and differentiated two or more objects, determining a column position of the inner surface of the plate; and
        based on the column position determined for the inner surface of the plate, estimating the z-distance between the imaging component and the inner surface of the plate; and
    moving the imaging component to a z-position at which the biological sample is focused, based on the estimated z-distance.

2. The method recited in claim 1, wherein the imaging component comprises an objective of a microscope.

3. The method recited in claim 2, wherein the laser light beam is offset from the center of the objective.

4. The method recited in claim 1, wherein the z-distance is measured in a vertical direction.

5. The method recited in claim 1, wherein the z-distance directly corresponds to the position of the inner surface reflection on the image.

6. The method recited in claim 1, wherein processing the image by a computerized device comprises:
    cropping the image to obtain a desired region, wherein the representative values are determined for each column of the desired region and wherein the linear array is populated with the representative values determined for each column of the desired region;
    determining a local minimum of the linear array;
    determining a threshold value based on the local minimum;
    based on the threshold value, identifying and differentiating objects corresponding to the received reflections;
    based on the identified and differentiated objects, determining a column position of the inner surface reflection; and
    based on the column position determined for the inner surface reflection, estimating the z-distance between the imaging component and the inner surface of the plate.

7. The method recited in claim 6, wherein the representative values for each column comprise a largest value of intensity found in any row of the column.

8. The method recited in claim 6, wherein the local minimum comprises the minimum value of intensity that is at least a predetermined number of columns away from the column having the highest value of intensity.

9. The method recited in claim 6, wherein the threshold value is determined by adding a predetermined threshold adjustment value to the local minimum.

10. The method recited in claim 6, wherein identifying and differentiating objects corresponding to the received reflections comprises:
    closing gaps between intensity peaks of the linear array;
    applying the threshold value to the values of the linear array to produce a binary array;
    removing potential object representations from the binary array that are smaller than a threshold object width; and determining reflection objects based on the values remaining in the binary array.

11. A method of performing screening of biological samples in an HCI system, the biological samples being positioned on wells of a plate, the plate having inner and outer surfaces, the HCI system having an objective and a camera for imaging the biological samples, the method comprising:
  manually establishing a desired focal position for the objective;
  training the system to correlate the desired focal position to a first z-position of a laser reflection of the inner surface of the plate on a first image taken by the camera;
  for each biological sample to be imaged:
    aligning the objective with the sample;
    producing a subsequent image taken by the camera, the subsequent image comprising received laser reflections at the aligned objective;
    determining a second position of the laser reflection on the inner surface of the plate from the subsequent image;
    tracking the objective to an estimated focal position along a z-axis corresponding to the sample, the estimated focal position being based on a comparison between the first z-position of the laser reflection and the second position of the laser reflection of the inner surface of the plate corresponding to the aligned objective; and
    performing screening of the sample using the objective at the estimated focal position.

12. The method recited in claim 11, wherein training the system comprises:
  processing the first image taken by the camera to determine first and second reflection objects on the first image; and
  determining the location of the reflection object on the first image, corresponding to the inner surface laser reflection.

13. The method recited in claim 12, wherein tracking the objective comprises:
  estimating a desired z-position for the objective;
  moving the objective to the estimated z-position;
  producing a second image using the camera;
  processing the second image by a computerized device to determine a location on the second image of the laser reflection of the inner surface of the plate corresponding to the aligned position of the objective; and
  determining the estimated focal position based on the locations of the inner surface reflections on the first and second images.

14. The method recited in claim 13, wherein the z-position is measured in a vertical direction.

15. The method recited in claim 13, wherein the focal distance directly corresponds to the position of the inner surface reflection on the image.

16. An HCI system, comprising:
  a removable plate having an inner surface and an opposing outer surface, the plate being adapted to receive biological samples on the inner surface;
  an imaging component that magnifies and focuses in on the biological samples;
  a laser-based autofocus (LAF) device that shines a laser light beam through the imaging component toward the plate so that reflections of the laser light from the inner and outer surfaces of the plate pass back through the imaging component;
  a drive mechanism that moves the imaging component toward and away from the plate in a z direction;
  a camera that records images of the biological samples received from the imaging component, including for each biological sample to be imaged, an image comprising at least the reflections of the laser light from the inner and outer surfaces of the plate at a first z-position; and
  a computer device that determines, for each biological sample to be imaged, where to move the imaging component in the z-direction based on an analysis of the image recorded by the camera that includes the reflections of the laser light from the inner and outer surfaces of the plate at the first z-position.

17. The system recited in claim 16, wherein the imaging component comprises an objective of a microscope.

18. The system recited in claim 17, wherein the LAF device is positioned so that the laser light beam shined through the objective is offset from the center of the objective.

19. The system recited in claim 16, wherein the z direction is a vertical direction.

20. The system recited in claim 16, wherein the computer device determines where to move the imaging component based on the location on the image of the inner surface reflection.

* * * * *